(12) United States Patent
Nelson et al.

(10) Patent No.: US 6,276,345 B1
(45) Date of Patent: Aug. 21, 2001

(54) DUAL FUEL SYSTEM FOR AN INTERNAL COMBUSTION ENGINE

(75) Inventors: Dean M. Nelson, Sheboygan; Timothy S. Thiel, Plymouth; Christopher R. Dudzinski, Fond du Lac, all of WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 09/470,350

(22) Filed: Dec. 22, 1999

Related U.S. Application Data
(60) Provisional application No. 60/113,776, filed on Dec. 23, 1998.

(51) Int. Cl.[7] .................................................. F02M 21/02
(52) U.S. Cl. ........................................... 123/525; 123/527
(58) Field of Search ............................... 123/27 GE, 525, 123/527

(56) References Cited

U.S. PATENT DOCUMENTS

| | | |
|---|---|---|
| 1,931,698 | 10/1933 | Holzapfel ................................ 261/16 |
| 1,970,425 | 8/1934 | Grabbe .................................. 123/121 |
| 2,297,217 | 9/1942 | Hartner-Seberich ................. 123/121 |
| 2,339,988 | 1/1944 | Gerson et al. ............................. 62/1 |
| 3,659,574 | 5/1972 | Reschke et al. ...................... 123/121 |
| 3,718,000 | 2/1973 | Walker .................................... 60/285 |
| 4,305,350 | 12/1981 | Brown et al. ........................... 123/59 |
| 4,335,697 | 6/1982 | McLean ................................. 123/527 |
| 4,369,751 | 1/1983 | Batchelor et al. .................... 123/527 |
| 4,373,493 | 2/1983 | Welsh .................................... 123/525 |
| 4,393,848 | 7/1983 | Poehlman ............................. 123/525 |
| 4,416,244 | 11/1983 | McDonald ............................ 123/577 |
| 4,489,699 | 12/1984 | Poehlman ............................. 123/525 |
| 4,492,207 | 1/1985 | Hallberg ................................ 123/527 |
| 4,574,763 | 3/1986 | Hallberg ................................ 123/527 |

*Primary Examiner*—Noah P. Kamen
(74) *Attorney, Agent, or Firm*—Quarles & Brady LLP

(57) ABSTRACT

A gaseous fuel adaptor for modifying an internal combustion engine having a liquid fuel carburetor. The carburetor has an air intake for receiving air to mix with a liquid fuel. The adaptor includes a body mounted over the carburetor air intake and a passageway having an inlet and an outlet formed in the body. Air enters the passageway through the inlet and air exits the passageway through the outlet into the carburetor air intake. A gaseous fuel feed port disposed between the passageway inlet and outlet feeds gaseous fuel into the passageway, and a butterfly valve disposed in the passageway between the gaseous fuel feed port and the passageway inlet meters air entering the passageway to mix with the gaseous fuel.

11 Claims, 2 Drawing Sheets

DUAL FUEL SYSTEM FOR AN INTERNAL COMBUSTION ENGINE

CROSS REFERENCES TO RELATED APPLICATIONS

This application claims the benefit of U.S. Provisional Application No. 60/113,776, filed on Dec. 23, 1998.

STATEMENT REGARDING FEDERALLY SPONSORED RESEARCH

Not Applicable

FIELD OF THE INVENTION

The field of the invention relates to internal combustion engines, more particularly to an adaptor for modifying an internal combustion engine to accommodate dual fuels.

DESCRIPTION OF THE BACKGROUND ART

Engines having dual fuel systems are capable of consuming liquid fuel, such as gasoline, and gaseous fuel, such as propane. This dual fuel capability is advantageous when an engine is required to work indoors where the exhaust from a gasoline engine is unacceptable, and outdoors where the power requirements of the engine may exceed the capabilities of a propane burning engine.

Dual fuel systems for internal combustion engines, such as disclosed in U.S. Pat. No. 4,492,207, are known in the art. These systems typically require a venturi type mixer having a narrow control range for metering combustion air mixing with the gaseous fuel. The narrow control range of a venturi complicates the mixer design when the engine operation requires a high and low speed.

Furthermore, dual fuel systems are often integrated with the liquid fuel carburetor. A dual fuel carburetor is more expensive to make and has a limited market.

SUMMARY OF THE INVENTION

The present invention provides a gaseous fuel adaptor for modifying an internal combustion engine having a conventional liquid fuel carburetor. The carburetor has an air intake for receiving air to mix with a liquid fuel. The adaptor includes a body mounted over the carburetor air intake, and a passageway having an inlet and an outlet formed in the body. Air enters the passageway through the inlet and exits the passageway through the outlet into the carburetor air intake. A gaseous fuel feed port disposed between the passageway inlet and outlet feeds gaseous fuel into the passageway, and a butterfly valve disposed in the passageway between the gaseous fuel feed port and the passageway inlet meters air passing through the passageway.

A general objective of the present invention is to provide an adaptor for use with a liquid fueled internal combustion engine which provides a gaseous fuel for use in the engine. This objective is accomplished by providing an adaptor which mounts over a carburetor intake of the liquid fueled internal combustion engine and provides a gaseous fuel/air mixture into the carburetor.

The foregoing and other objects and advantages of the invention will appear from the following description. In the description, reference is made to the accompanying drawings which form a part hereof, and in which there is shown by way of illustration a preferred embodiment of the invention.

DETAILED DESCRIPTION OF THE PREFERRED EMBODIMENTS

Figure 1:
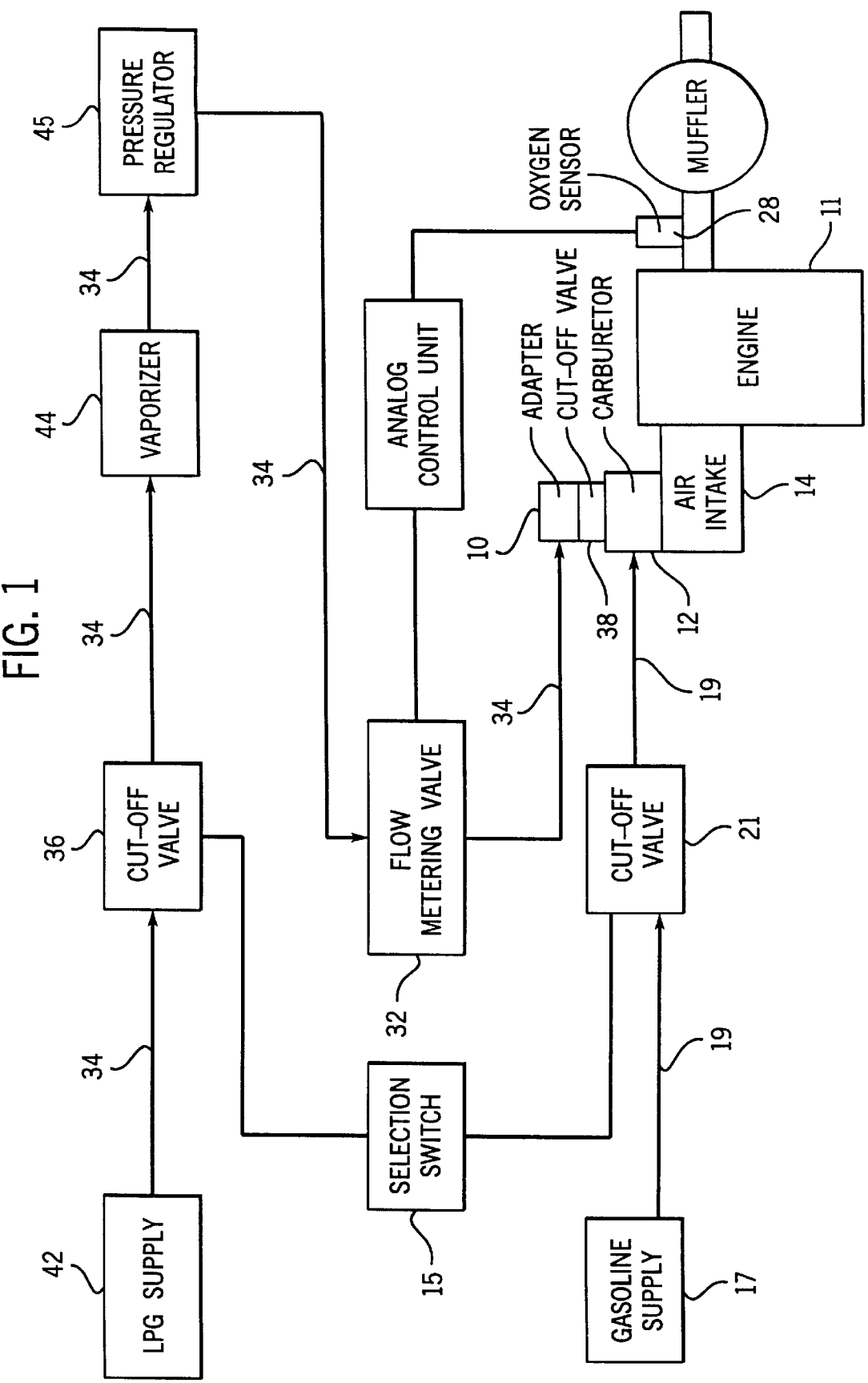
FIG. 1 is a block diagram of a dual fuel system for an internal combustion engine incorporating the present invention.

Referring to FIG. 1, a conventional gasoline internal combustion engine 11 adapted to operate on liquid fuel, such as gasoline, or a gaseous fuel, such as vaporized liquid propane gas (LPG), has a conventional carburetor 12 with an air intake 14, and a LPG adaptor 10 which provides LPG to the engine 11 through the carburetor air intake 14. A fuel selection switch 15 cuts off the flow of LPG from a LPG supply when the engine 11 is operated on gasoline and cuts off the flow of gasoline from a gasoline supply 17 when the engine 11 operates on LPG.

The internal combustion engine 11 fitted with the adaptor 10 operates on vaporized LPG when the fuel selection switch 15 selects a gaseous fuel. The LPG supply 42 is communicatively connected to the adaptor 10 through a supply line 34, such as a hollow tube. The supply line 34 feeds liquefied LPG through a cut-off valve 36 and into a vaporizer 44 which vaporizes the liquefied LPG into a gaseous state. The cut-off valve 36, such as a solenoid valve, shuts off the flow of LPG when the engine 11 is operating on gasoline. The vaporized LPG flows from the vaporizer 44 into a pressure regulator 45, and then through a flow metering valve 32 before exiting the supply line 34 into the adaptor 10. The pressure regulator 45 reduces the pressure of the LPG passing through the flow metering valve 32.

The engine 11 operates on a specified air/fuel ratio. An oxygen sensor 28 in the engine exhaust provides an input to an analog control unit 40 which controls the flow metering valve 32. The flow metering valve 32 meters the supply of LPG in response to the oxygen content in the engine exhaust in order to maintain the specified air/fuel ratio.

Figure 2:
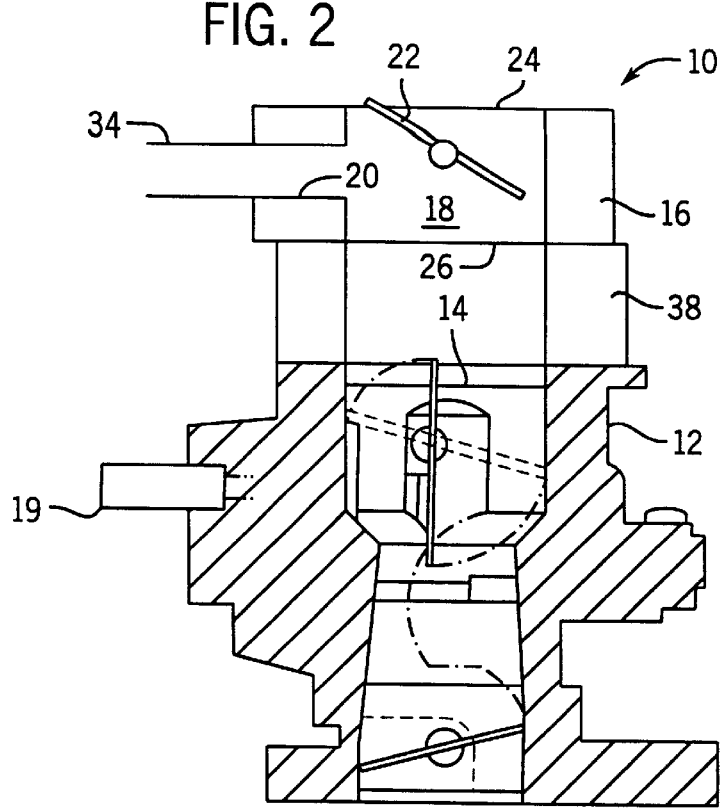
FIG. 2 is a schematic cross sectional view of the carburetor, adaptor, and spacer of FIG. 1 in a gaseous fuel mode.
Figure 3:
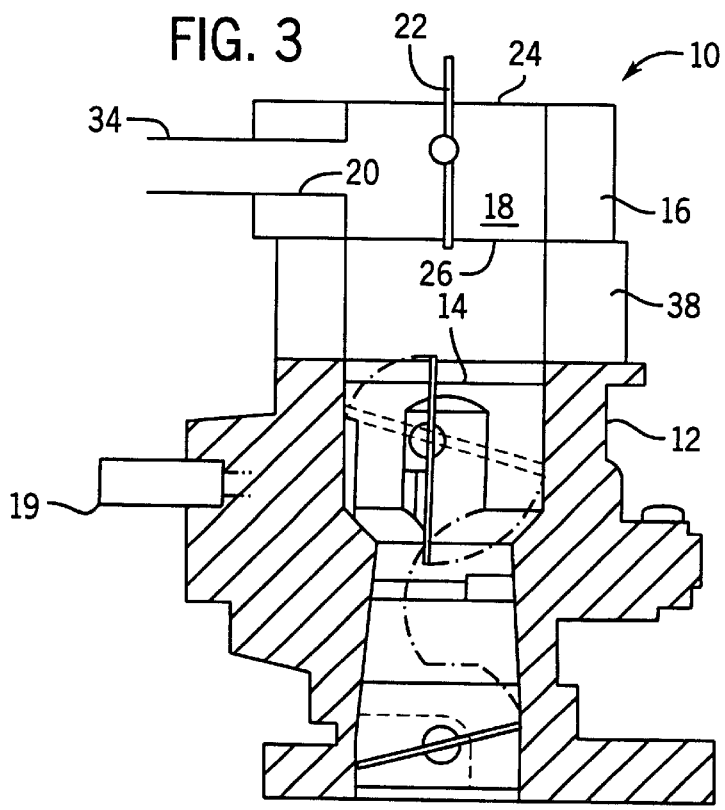
FIG. 3 is a schematic cross sectional view of the carburetor, adaptor, and spacer of FIG. 1 in a liquid fuel mode.

The adaptor 10 mixes the LPG with air for combustion by the engine 11. As shown in FIGS. 2 and 3, the LPG adaptor 10 is mounted over the air intake 14, by bolting or the like, and provides air mixed with LPG to the carburetor 12. The adaptor 10 has a body 16 with a passageway 18 formed therethrough, a LPG feed port injects LPG into the passageway 18, and a butterfly valve 22 regulates air entering the passageway 18 to mix with the LPG. Although an aluminum body is preferred, other materials suitable for use with an engine 11, such as cast iron, plastic, or the like may be used.

The passageway 18 guides combustion air from the atmosphere toward the carburetor air intake 14, and provides a chamber for mixing the LPG with the air. Air enters the passageway 18 through an inlet 24 and exits the passageway 18 through an outlet 26. Preferably, the passageway 18 has a diameter substantially equal to the carburetor air intake 14 diameter to minimize air flow losses and is formed by a bore in the body 16.

The LPG feed port 20 feeds LPG from the LPG supply 42 into the passageway 18 and is interposed between the passageway inlet 24 and outlet 26. The volume of LPG fed into the passageway 18 varies in response to the pressure in the passageway 18 at the LPG feed port 20 and the amount of oxygen sensed in the engine exhaust by the oxygen sensor 28.

The butterfly valve 22 disposed upstream of the LPG feed port 20 in the passageway inlet 24 has a liquid fuel position (shown in FIG. 3) for liquid fuel operation and a gaseous fuel position (shown in FIG. 2) for gaseous fuel operation. An automatic positioning mechanism, such as a solenoid, changes the butterfly valve position in response to the fuel selection switch 15. Alternatively, the butterfly valve position may be changed manually.

During gaseous fuel operation, the butterfly valve is at least partially closed to regulate air passing through the passageway 18 into the carburetor air intake 14. The regulated air mixes with LPG fed into the air passageway 18 through the LPG feed port 20 disposed downstream of the butterfly valve 22. Preferably, the butterfly valve 22 is slightly undersized to form a gap between the butterfly valve 22 and the passageway wall when the butterfly valve is in a fully closed position. The gap causes a pressure drop in the air flowing past the LPG feed port 20. The pressure drop creates a suction within the LPG feed port 20 that varies with a changing air flow in the LPG adaptor passageway 18.

This varying suction meters the flow of LPG into the passageway 18 in response to the engine loads. At a higher engine load, the air requirements of the engine 11 increases increasing the air flowing past the LPG feed port 20 causing a greater suction in the LPG feed port 20. The greater suction pulls a greater volume of LPG into the passageway 18. When the engine load is lowered, air flowing past the LPG feed port 20 decreases, and the suction in the LPG feed port 20 decreases decreasing the volume of LPG entering the passageway 18. Advantageously, the butterfly valve closed position may be adjusted to alter the air/fuel mixture to accommodate various engine operating conditions.

A spacer 38 disposed between the LPG adaptor 10 and carburetor 12 extends the adaptor passageway 18 providing an efficient mixing chamber for mixing combustion air and LPG. Advantageously, the spacer 38 provides clearance for carburetor components, such as bowl vents and idle air jets. The spacer 38 can be formed as an integral part of the adaptor body, lengthened or shortened to accommodate different carburetors, or can be eliminated if the passageway 18 in the LPG adaptor 10 provides sufficient clearance and mixing efficiency.

Looking particularly at FIG. 2, during LPG operation, the gasoline supply is cut off by the gasoline cut off valve 21 (shown in FIG. 1), and the LPG line is opened. The butterfly valve 22 is set at an almost closed angle to aid in controlling the air-fuel ratio. The partially closed butterfly valve 22 causes a pressure drop at the LPG feed port 20 which creates a suction at the LPG feed port 20 that varies with the changing air flow in the LPG adaptor air passageway 18. This varying suction meters a greater volume of LPG at higher engine loads and lesser volume at lighter engine loads. The oxygen sensor 28 senses the oxygen content of the engine exhaust and provides an input to the analog control unit 40 which controls the fuel metering valve 32 to meter the LPG/air mixture entering the engine 11. Of course, if the butterfly valve 22 is undersized, the butterfly valve 22 can be fully closed to meter the air entering the adaptor passageway 18.

Referring back to FIG. 1, the internal combustion engine 11 also operates conventionally on liquid fuel fed directly into the carburetor when the fuel selection switch 15 selects a liquid fuel. The gasoline supply 17 is communicatively connected to the carburetor 12 through a supply line 19, such as a hollow tube. The supply line 19 feeds gasoline through a gasoline cut-off valve 21 controlled by the fuel selection switch 15. The carburetor conventionally mixes the gasoline with air flowing in the air intake 14 for combustion by the engine 11.

Looking particularly at FIG. 3, during gasoline operation, the LPG supply is cut off by the LPG cut off valve 36 (shown in FIG. 1), and the gasoline supply line is opened. The engine 11 and carburetor 12 operate as a conventional gasoline engine 11. The LPG adaptor butterfly valve 22 is opened to provide maximum air flow into the carburetor 12 through the passageway 18. The carburetor 12 meters the gasoline/air mixture entering the engine 11.

Looking particularly at FIG. 2, during LPG operation, the gasoline supply is cut off by the gasoline cut off valve 21 (shown in FIG. 1), and the LPG line is opened. The butterfly valve 22 is set at an almost closed angle to aid in controlling the air-fuel ratio. The partially closed butterfly valve 22 causes a pressure drop at the LPG feed port 20 which creates a suction at the LPG feed port 20 that varies with the changing air flow in the LPG adaptor air passageway 18. This varying suction meters a greater volume of LPG at higher engine loads and lesser volume at lighter engine loads. The oxygen sensor 28 senses the oxygen content of the engine exhaust and provides an input to the analog control unit 40 which controls the fuel metering valve 32 to meter the LPG/air mixture entering the engine 11. Of course, if the butterfly valve 22 is undersized, the butterfly valve 22 can be fully closed to meter the air entering the adaptor passageway 18.

While there has been shown and described what are at present considered the preferred embodiment of the invention, it will be obvious to those skilled in the art that various changes and modifications can be made therein without departing from the scope of the invention.

What is claimed is:

1. A gaseous fuel adaptor for modifying an internal combustion engine having a carburetor to operate using gaseous fuel, said carburetor having an air intake for receiving air to mix with a liquid fuel, said adaptor comprising:
   a body mounted over said carburetor air intake;
   a passageway having an inlet and an outlet formed in said body, wherein during gaseous fuel operation, air enters said passageway through said inlet and air exits said passageway through said outlet into the carburetor air intake;
   a gaseous fuel feed port disposed between said passageway inlet and outlet for feeding gaseous fuel into said passageway; and
   a butterfly valve disposed in said passageway between said gaseous fuel feed port and said passageway inlet for metering air passing through said passageway.

2. A gaseous fuel adaptor as in claim 1, including a spacer for increasing the length of said passageway.

3. A gaseous fuel adaptor as in claim 2, in which said spacer is formed as an integral part of said body.

4. A gaseous fuel adaptor as in claim 1, in which said butterfly valve reduces the cross sectional area of said passageway to cause a pressure drop in air flowing into said passageway past said butterfly valve when gaseous fuel is fed into said passageway.

5. A gaseous fuel adaptor as in claim 1, in which said butterfly valve defines a gap between said butterfly valve and a wall of said passageway when said butterfly valve is in a closed position for metering air passing through said passageway.

6. A dual fuel system for use with an internal combustion engine comprising:
   a carburetor having an air intake for receiving air to mix with a liquid fuel;
   a gaseous fuel adaptor having a body mounted over said carburetor air intake; a passageway having an inlet and an outlet formed in said body, wherein air enters said passageway through said inlet, and air exits said passageway through said outlet into said carburetor air intake; a gaseous fuel feed port disposed between said passageway inlet and outlet for feeding gaseous fuel into said passageway, and a butterfly valve disposed in said passageway between said gaseous fuel feed port and said passageway inlet for metering air passing through said passageway;

a liquid fuel supply line for feeding liquid fuel to said carburetor;

a liquid fuel cut valve off for cutting off the supply of liquid fuel in said liquid fuel supply line when the internal combustion engine is consuming gaseous fuel, a gaseous fuel supply line for feeding gaseous fuel to said adaptor;

a gaseous fuel cut off valve for cutting off the gaseous fuel supply in said gaseous fuel supply line when the internal combustion engine is consuming liquid fuel, a gaseous fuel metering valve disposed in said gaseous fuel supply for metering said supply of gaseous fuel when the internal combustion engine is consuming gaseous fuel.

7. The dual fuel system as recited in claim 6, wherein said gaseous fuel metering valve meters said gaseous fuel in response to a sensor in a combustion exhaust of the internal combustion engine.

8. A gaseous fuel adaptor as in claim 6, including a spacer for increasing the length of said passageway.

9. A gaseous fuel adaptor as in claim 8, in which said spacer is formed as an integral part of said body.

10. A gaseous fuel adaptor as in claim 6, in which said butterfly valve reduces the cross sectional area of said passageway to cause a pressure drop in air flowing into said passageway past said butterfly valve when gaseous fuel is fed into said passageway.

11. A gaseous fuel adaptor as in claim 6, in which said butterfly valve defines a gap between said butterfly valve and a wall of said passageway when said butterfly valve is in a closed position for metering air passing through said passageway.

* * * * *